United States Patent [19]

Skalla et al.

[11] 4,088,617

[45] May 9, 1978

[54] PHONOGRAPHIC RECORD MOLDING COMPOSITION

[75] Inventors: Dale Skalla, Cicero; William C. Meisenhelder, Downers Grove; Henry Alsberg, Northbrook, all of Ill.

[73] Assignee: The Richardson Company, Des Plaines, Ill.

[21] Appl. No.: 688,070

[22] Filed: May 19, 1976

[51] Int. Cl.$^2$ .............................................. C08L 91/00
[52] U.S. Cl. ........................... 260/23 ST; 260/23 AR; 260/23 S; 260/28.5 AV; 260/28.5 R; 526/329
[58] Field of Search ................. 260/28.5 AV, 28.5 R, 260/23 ST, 23 AR, 23 S; 526/329

[56] References Cited

U.S. PATENT DOCUMENTS

| | | | |
|---|---|---|---|
| 3,080,348 | 3/1963 | Lang et al. | 526/329 |
| 3,427,275 | 2/1969 | Davis et al. | 526/329 |
| 3,640,977 | 2/1972 | Gozenbach et al. | 526/329 |
| 3,917,552 | 11/1975 | Bischoff et al. | 260/28.5 AV |
| 3,922,255 | 11/1975 | Koestler et al. | 526/329 |
| 3,953,408 | 4/1976 | Hosoi et al. | 526/329 |

*Primary Examiner*—Melvyn I. Marquis
*Attorney, Agent, or Firm*—Lockwood, Dewey, Zickert & Alex

[57] ABSTRACT

A phonograph record molding composition formed by copolymerizing a vinyl aromatic monomer with an acrylic ester monomer in the presence of one or more waxes which composition is especially suitable for injection and compression molding and which is characterized by substantially improved wear resistance, particularly when compared to conventional polystyrene record molding materials. The compositions of this invention comprise about 90 to 98, preferably 94 to 97, weight percent of vinyl aromatic/acrylic ester copolymer (with the weight ratio of vinyl aromatic to acrylic ester of from about 10:1 to 40:1), about 1 to 9, preferably 3 to 6, weight percent of the wax component and about 0.1 to 3, preferably 0.1 to 0.8, weight percent of a suitable lubricant. Preferred copolymers are styrene/2-ethylhexyl acrylate and styrene/stearyl methacrylate copolymers.

21 Claims, No Drawings

PHONOGRAPHIC RECORD MOLDING COMPOSITION

BACKGROUND AND DESCRIPTION OF THE INVENTION

The present invention generally relates to molding compositions and, in particular, to phonographic record molding compositions. In this regard, an important embodiment of this invention is directed to a molding composition which includes a copolymer of a vinyl aromatic monomer and an acrylic ester monomer and which is especially suited for the injection molding of phonographic records characterized by substantially improved wear resistance.

Conventionally, phonographic records are molded from either a polystyrene type material or a vinyl chloride/vinyl acetate copolymer resin. Generally, each of the types of record molding compositions are combined with suitable waxes and lubricants. The polystyrene based materials offer an important advantage over the polyvinyl chloride based materials in that they can be injection molded and do not require compression molding as is necessary with the polyvinyl chloride based materials. The polyvinyl chloride based materials, however, produce records having greater wear resistance and hence retain their original quality of sound through more plays than the polystyrene records.

In the compression molding of phonograph records, a thick and pliable biscuit is extruded and then placed in a compression mold and subjected to temperature and pressure conditions which flatten the biscuit into the desired disk shape. Injection molding of phonograph records, on the other hand, simply involves extrusion of the composition which is a powdered or pelletized form into an injection mold which is operated at suitable temperature and pressure conditions to produce the desired phonograph record. Generally speaking, injection molding is preferred since it allows faster production and requires less manual labor.

While polystyrene based materials offered important manufacturing advantages, their poorer wear properties have essentially limited their use to instances wherein superior wear resistance is not of primary importance.

The present invention overcomes the disadvantages of conventional polystyrene based record molding compositions by providing a novel composition which can be both injection and compression molded and which is characterized by significantly improved wear resistance when compared to prior art polystyrene materials. In accordance with an important aspect of the present invention, an improved phonograph record molding composition is provided which can be formed by copolymerizing a vinyl aromatic monomer with an acrylic ester monomer in the presence of one or more waxes. Generally, the record molding compositions of the present invention include a random copolymer of a vinyl aromatic monomer and an acrylic ester monomer wherein the weight ratio of vinyl aromatic to acrylic ester is from 10:1 to 40:1. These compositions comprise from 90 to 98, preferably 94 to 97, weight percent of such copolymers, about 1 to 9, preferably 3–6, weight percent wax component and, in addition, can include about 0.1 to 3, preferably 0.1 to 0.8, weight percent of a suitable lubricant. Preferred copolymer materials are styrene/2-ethylhexyl acrylate and styrene/stearyl methacrylate copolymers. A particularly preferred composition includes about 94 to 95 weight percent of a copolymer of styrene and 2-ethylhexyl acrylate or stearyl methacrylate, about 4 to 5 weight percent of waxes, and about 0.2 to 0.4 weight percent of lubricant.

Accordingly, an object of the present invention is to provide an improved record molding composition. Another object is to provide a record molding composition which selectively can be injection or compression molded and which is characterized by improved wear resistance when compared to prior art polystyrenebased record molding compositions. Another object is to provide an improved record molding composition which is formed by copolymerizing a vinyl aromatic such as styrene with an acrylic ester such as 2-ethylhexyl acrylate or stearyl methacrylate. These and other objects of the present invention will be apparent from the following detailed description of this invention.

As noted, an important aspect of the present invention concerns the discovery that vinyl aromatic/acrylic ester copolymers can be advantageously employed in record molding compositions to provide improved properties and characteristics thereto. In particular, these copolymers provide record molding compositions which can be both injection and compression molded to provide records having improved wear resistance when compared to prior art polystyrene homopolymer compositions.

The molding compositions of the present invention generally contain from about 90 to 98 weight percent of these copolymers with the weight ratio of vinyl aromatic to acrylic ester ranging from about 10:1 to 40:1 together with one or more waxes and lubricants. In addition, these compositions can also include stabilizers, pigments and/or dyes as well as anti-static materials, all of which are well known in the art.

For example, these compositions can include about 90 to about 98 weight percent of a copolymer of a vinyl aromatic (e.g. styrene) and an acrylic ester (e.g. 2-ethylhexyl acrylate or stearyl methacrylate) having a weight ratio of vinyl aromatic to acrylic ester of from about 10:1 to about 40:1 (preferably 17:1 to 35:1), about 1 to about 9 weight percent of a wax component, and about 0.1 to 3 weight percent of a lubricant material. In a more preferred embodiment, the record composition contains about 94 to about 97 weight percent of the copolymer with the range of 95 to 96 weight percent being particularly preferred as a composition which can be both injection and compression molded to provide phonograph records having excellent wear resistance.

The wax component in the compositions of this invention is generally a blend of different waxes more fully described below and is present in an amount of about 1 to 9 weight percent with a wax component concentration of about 3 to 6 weight percent being preferred and of about 4 to 5 weight percent being most preferred.

The lubricant component can be present in these compositions in an amount of from about 0.1 to about 3 weight percent and preferably is present in an amount of from about 0.1 to about 0.8 weight percent. In a most preferred embodiment, the lubricant is present in an amount of about 0.2 to about 0.4 weight percent.

Suitable vinyl aromatics contemplated by the present invention include styrene, 2-methylstyrene, tertiary butylstyrene and other vinyl substituted aromatic based materials. Styrene is especially preferred as a comonomer for many reasons including its availability, price and well known superior molding properties.

The acrylic ester contemplated by the present invention includes esters of acrylic and methacrylic acid as well as homologues and substituted products thereof. These esters can be produced by well known methods including by condensation reaction of a suitable alcohol with the unsaturated acid. Alcohols which can be reacted with the unsaturated acids include those having from about 1 to 18 or more carbon atoms per molecule. For example, alcohols which can be reacted with acrylic acid, methacrylic acid and other unsaturated acids include the saturated aliphatic alcohols, e.g. methanol, ethanol, propanol, butanol, pentanol, hexanol, heptanol, octanol, nonanol, decanol, undecanol, dodecanol, tridecanol, tetradecanol, pentadecanol, hexadecanol, heptadecanol, and octadecanol.

Especially preferred acrylic esters are those formed by condensation reaction of acrylic or methacrylic acid with alcohols such as stearyl and 2-ethylhexyl alcohol. Other acrylic monomers which can be utilized include butyl acrylate, hexyl acrylate, stearyl acrylate, octyl acrylate, decyl acrylate, octyl methacrylate, decyl methacrylate, propyl methacrylate, 2-ethylhexyl methacrylate, dodecyl acrylate, and dodecyl methacrylate.

As noted, the record molding compositions of the present invention can also include other materials which impart desirable properties thereto. For example, such materials include dyes or pigments which produce a desired color to the phonographic record, antioxidants which prevent degradation of the molded composition, stabilizers which prevent oxidation and reduce degradation such as, for example, is caused by ultra-violet light or high heat, and lubricants such as waxes or other materials which can be utilized to improve the mold release properties and lubricity of the composition.

Suitable antioxidants which can be used include di-t-butyl p-cresol marketed under the brand name "Ionol", diphenyl p-phenylene diamine, and other materials known in the art. Suitable lubricants include stearic acid, calcium stearate, zinc stearate, magnesium stearate, barium stearate, lead stearate and manganese stearate.

Preferred waxes include carnauba wax, microcrystalline saponified waxes having melting points, acid numbers and saponification numbers suitably modified in accordance with known parameters in this art. Microcrystalline petroleum branched chain paraffin having a melting point between 91° and 93° C. is an especially preferred wax for use in the compositons of the present invention.

The vinyl aromatic/acrylic ester copolymers used in the compositions of the present invention can be prepared by conventional polymerization techniques such as suspension or bulk polymerization using free radical catalysts such as peroxides or azo compounds. When using aqueous polymerization techniques, after the desired degree of polymerization has taken place and the copolymer is formed, the material can be filtered and then washed, dried and molded, using suitable molding apparatus, into a phonograph record. When using bulk or solution polymerization methods, after the desired copolymer is formed, the product is recovered as a mass which can then be extrusion pelletized and the pellets then used either in injection or compression molding processes.

In the following examples, wear tests were performed to evaluate the wear resistance of both compression molded and injection molded phonographic records employing the composition of the present invention. In performing these tests, the record was played on a "Realistic 44" turntable which was fitted with an automatic counter. The tone arm of the turntable was fitted with a diamond stylus and adjusted to exert a reasonably heavy tracking load of 6.25 grams. Each record was then rated aurally for wear noise against a control record compression molded from a standard polystyrene record compound played 50, 100, 150 and 200 times. For example, a 100 rating ascribed to a test record after 200 actual plays had taken place indicates that the test record yielded the same noise level as the control record yielded after 100 actual plays. In these tests, the control records were made from a commercial polystyrene record compound identified as "R-504" which is manufactured and sold by The Richardson Company.

These examples are offered to illustrate the phonograph record molding compositions of the present invention and are not to be construed as limitations on the scope thereof.

EXAMPLE I

A record compound was prepared by copolymerizing 362 parts by weight of styrene with 19 parts by weight of 2-ethylhexyl acrylate in the presence of about 8.8 parts by weight of a microcrystalline petroleum wax, 8.8 parts by weight a natural wax and 1.3 parts by weight of calcium stearate. The polymerization was carried out in an aqueous suspension using benzoyl peroxide as a catalyst and suspending agent. The reaction polymerized material was then washed, dried and molded into a test record using a compression molding technique. The record was tested for wear resistance and in comparison with the control polystyrene record produced the following results.

Table I

| Actual Plays | Wear Rating |
|---|---|
| 0 | 0 |
| 160 | 100 |
| 200 | 150 |

EXAMPLE II 29 pounds of styrene, 0.9 pounds of 2-ethylhexyl acrylate, 0.7 pounds of a natural wax, 0.7 pounds of microcrystalline wax and 0.105 pounds of calcium stearate were heated to form a solution. Five grams of di-t-butyl peroxide were then added and the solution was polymerized for 12 hours at 210° to 220° F. followed by 8 hours at temperatures ranging from 220° to 400° F. The polymer was then extrusion pelletized. The pellets were then compression molded into a test record which was wear tested. The results of this wear testing were as follows:

Table II

| Actual Plays | Wear Rating |
|---|---|
| 0 | 0 |
| 100 | 50 |
| 150 | 50–100 |
| 200 | 50–100 |
| 250 | 100–150 |

EXAMPLE III

A record composition was made in accordance with the procedure described in Example I except that stearyl methacrylate was substituted for the 2-ethylhexyl acrylate. The results of wear tests performed on records made from this composition were as follows:

Table III

| Actual Plays | Wear Rating |
|---|---|
| 160 | 100 |
| 200 | 100 |
| 250 | 150 |

EXAMPLE IV

In this example, a molding composition similar to that described in Example II but with a weight ratio of styrene to 2-ethylhexyl acrylate in the copolymer of 97 to 3 was mixed with a black dye and then extrusion pelletized. These pellets were then injection molded into records. For comparison purposes, a commercial polystyrene record composition was also injection molded into phonograph records and both of these injected molded phonograph records tested for wear resistance against the compression molded control phonograph record. The records of each material were played 10, 20, 30, 40, 50 and 60 times and rated against the compression molded control record. The results obtained are shown below in Table IV.

Table IV

| Actual Plays (Compression Molded Control Record) | Wear Rating (Injection Molded Records) | |
|---|---|---|
| | Copolymer | Polystyrene |
| 10 | 0 | 0+ |
| 20 | 0 | 50 |
| 30 | 0–50 | 50–100 |
| 40 | 0–50 | 100 |
| 50 | 50 | 150 |
| 60 | 100 | 150–200 |

As the wear ratings from the foregoing examples show, both injection and compression molded phonograph records produced from the molding compositions of the present invention were consistently characterized by substantially improved wear resistance when compared to conventional polystyrene record molding materials. Accordingly, these data show that record molding compositions employing the vinyl aromatic/acrylic ester copolymers are significantly superior to commercially available polystyrene record compounds, enabling the compositions of the present invention to be used in the injection and compression molding of phonograph records having superior wear resistance properties.

While in the foregoing specification certain embodiments and examples of this invention have been described in detail, it will be appreciated that modifications and variations therefrom will be apparent to those skilled in this art. Accordingly, this invention is to be limited only by the scope of the appended claims.

We claim:

1. A phonograph record molding composition consisting essentially of from about 90 to about 98 weight percent of a copolymer of a vinyl aromatic monomer and an acrylic ester monomer, said acrylic ester being an ester of acrylic or methacrylic acid and a saturated aliphatic alcohol having 3 to 18 carbon atoms, wherein the weight ratio of vinyl aromatic to acrylic ester is from about 10:1 to 40:1, and about 1 to 9 weight percent of a wax component, said phonograph record molding composition being either compression or injection moldable while exhibiting greater wear resistance than polystyrene injection moldable phonograph record compositions.

2. The record molding composition of claim 1 wherein said copolymer is present in an amount of from 94 to 97 weight percent.

3. The record molding composition of claim 1 wherein said copolymer is present in an amount of from 95 to 96 weight percent.

4. The record molding composition of claim 1 wherein the weight ratio of said vinyl aromatic to said acrylic ester is from about 17:1 to 35:1.

5. The record molding composition of claim 1 wherein said vinyl aromatic is styrene.

6. The record molding composition of claim 1 wherein said acrylic ester is selected from the group 2-ethylhexyl acrylate, stearyl methacrylate, butyl acrylate, hexyl acrylate, stearyl acrylate, octyl acrylate, decyl acrylate, octyl methacrylate, decyl methacrylate, propyl methacrylate, 2-ethylhexyl methacrylate, dodecyl acrylate, and dodecyl methacrylate.

7. The record molding composition of claim 1 wherein said acrylic ester is 2-ethylhexyl acrylate.

8. The record molding composition of claim 1 wherein said acrylic ester is stearyl methacrylate.

9. The record molding composition of claim 1 wherein said copolymer is styrene/2-ethylhexyl acrylate.

10. The record molding composition of claim 1 wherein said copolymer is styrene/stearyl methacrylate.

11. The record molding composition of claim 1 wherein said copolymer and said wax are solids.

12. A phonograph record molding composition consisting essentially of from about 90 to about 98 weight percent of a styrene/acrylic ester copolymer having a weight ratio of styrene to acrylic ester of from about 10:1 to 40:1, said acrylic ester being an ester of acrylic or methacrylic acid and a saturated aliphatic alcohol having 3 to 18 carbon atoms, about 1 to 9 weight percent of a wax component, and about 0.1 to 3 weight percent of a lubricant component, said phonograph record molding composition being either compression or injection moldable and having a wear resistance greater than polystyrene injection moldable phonograph record compositions.

13. The record molding composition of claim 12 wherein said copolymer is present in an amount of from 94 to 97 weight percent, said wax component is present in an amount of from 3 to 6 weight percent, and said lubricant component is present in an amount of from 0.1 to 0.8 weight percent.

14. The record molding composition of claim 12 wherein said copolymer is present in an amount of from 95 to 96 weight percent, said wax component is present in an amount of from 4 to 5 weight percent, and said lubricant component is present in an amount of from 0.2 to 0.4 weight percent.

15. The record molding composition of claim 12 wherein said acrylic ester is selected from the group 2-ethylhexyl acrylate, stearyl methacrylate, butyl acrylate, hexyl acrylate, stearyl acrylate, octyl acrylate, decyl acrylate, octyl methacrylate, decyl methacrylate, propyl methacrylate, 2-ethylhexyl methacrylate, dodecyl acrylate, and dodecyl methacrylate.

16. The record molding composition of claim 12 wherein said copolymer is styrene/2-ethylhexyl acrylate.

17. The record molding composition of claim 12 wherein said copolymer is styrene/stearyl methacrylate.

18. A phonograph record molding composition consisting essentially of from about 90 to about 98 weight percent of a vinyl aromatic/acrylic ester copolymer selected from the group consisting of styrene/2-ethylhexyl acrylate and styrene/stearyl methacrylate, wherein the weight ratio of vinyl aromatic to acrylic ester is from about 10:1 to 40:1, from about 1 to 9 weight percent of a wax component, and from about 0.1 to 3 percent of a lubricant component, said phonograph recording molding composition being either compression or injection moldable and having a wear resistance greater than polystyrene injection moldable phonograph record compositions.

19. The record molding composition of claim 18 wherein said copolymer is present in an amount of from 94 to 97 weight percent, said wax component is present in an amount of from 3 to 6 weight percent, and said lubricant component is present in an amount of from 0.1 to 0.8 weight percent.

20. The record molding composition of claim 18 wherein said copolymer is present in an amount of from 95 to 96 weight percent, said wax component is present in an amount of from 4 to 5 weight percent, and said lubricant component is present in an amount of from 0.2 to 0.4 weight percent.

21. A method of preparing a phonograph record molding composition, comprising: copolymerizing a vinyl aromatic monomer and an acrylic ester monomer that is an ester of acrylic or methacrylic acid and a saturated aliphatic alcohol having 3 to 18 carbon atoms to form a copolymer having a weight ratio of from about 10:1 to 40:1 of vinyl aromatic to acrylic ester said copolymerizing being in the presence of from about 1 to 9 weight percent of a wax component based on the weight of the molding composition.

* * * * *